S. KREPS.
BAKER'S PEEL.
APPLICATION FILED SEPT. 16, 1916. RENEWED JULY 24, 1918.
1,279,361.   Patented Sept. 17, 1918.
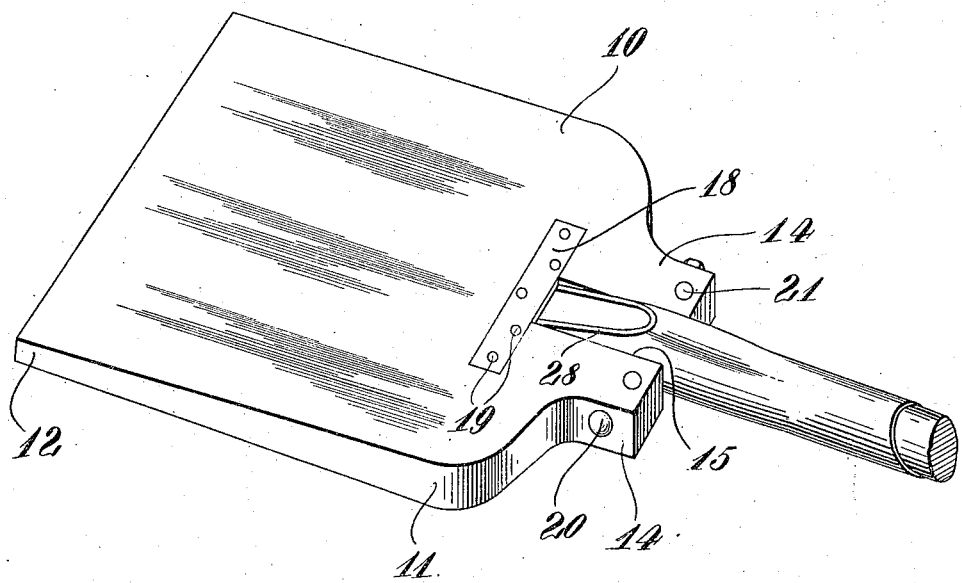
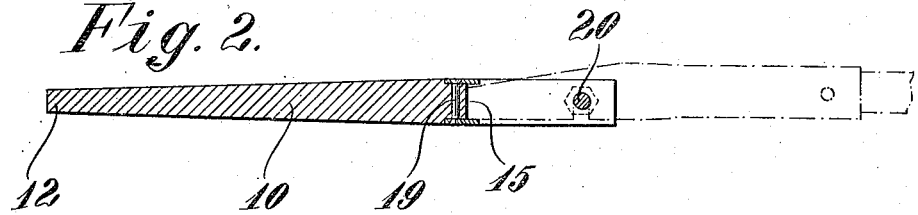
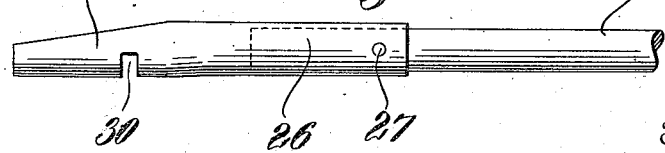
Inventor
Stefan Kreps
By his Attorney
Oscar Geier

UNITED STATES PATENT OFFICE.

STEFAN KREPS, OF NEW YORK, N. Y.

BAKER'S PEEL.

1,279,361.  Specification of Letters Patent.  Patented Sept. 17, 1918.

Application filed September 16, 1916, Serial No. 120,445. Renewed July 24, 1918. Serial No. 246,611.

*To all whom it may concern:*

Be it known that I, STEFAN KREPS, a subject of the Emperor of Austria-Hungary, and a resident of New York, in the county of New York and State of New York, have invented certain new and useful Improvements in Bakers' Peels, of which the following is a specification.

This invention relates to improvements in implements for bakers' use and particularly with reference to devices for entering dough batches into the ovens, known as peels.

The principal object of the invention is to provide an implement which may be used in connection with a removable handle, the handle being suited to engage with a number of blades, thereby providing an implement which is susceptible of being stored in a small space.

A second object is to provide an implement which may be used either side up, so that should moisture from the dough affect the wooden blade, causing it to bend and thus assume a curvature, the blade may be reversed so as to counteract the bending and be maintained in a substantially straight condition.

These and other objects, such as simplicity and economy in construction, are obtained by the novel design and combination of parts herafter described and shown in the accompanying drawing, forming a material part of this disclosure and in which, Figure 1 is a perspective view showing an implement made in accordance with the invention, Fig. 2 is a longitudinal sectional view taken through the blade portion, and Fig. 3 is a partial side elevational view of the handle used in engagement therewith.

The invention is comprised mainly of a substantial rectangular plate 10, thicker toward the heel portion 11 than toward the edge 12, and provided with rearwardly extending projections 14 between which is an open slot 15 terminating substantially with the heel portion 11, the end of the slot being covered by metallic plates 18 disposed upon opposite sides and set so as to be level or flush with the surface of the peel blade, the plates being held in position by rivets 19.

Passing transversely through the projections 14, is a fixed bar 20, the same being central of the projections near their ends, and secured rigidly therein, rivets 21, tending to prevent the wood from splitting.

The handle element is comprised of a wooden rod or bar 25 at the forward or operative end of which is attached a ferrule 26 held in position by the rivet 27; the ferrule extends outward toward the front and has a beveled surface 28, cut through the tubular ferrule, substantially to the center of its extreme front end, the flattened portion being adapted to engage with the plates 18, irrespective of whichever side of the plate be uppermost.

A transverse slot 30 is formed in the opposite side of the extending ferrule, the slot being engageable with the rod 20, whereby the handle is prevented from disengagement with the blade when in operation.

From the foregoing it will be understood that the handle may be applied with equal facility to either side of the blade, or released therefrom by merely raising the handle to such an extent, as will permit the slot 30 to be released from its engagement with the bar 20, whereupon it may be removed without difficulty.

In operation, the several batches of dough from which biscuits, rolls or bread are to be baked, are placed in relative position on the surface of the peel blade, the handle inserted and the entire device with the dough entered into the oven, whereupon a sudden rapid withdrawal of the apparatus tends to release the dough which then falls upon the surface of the oven, allowing the peel to be removed and used in a similar manner with other batches of dough.

The handle may be readily attached into any other peel blade, thus allowing a large number of the blades to be used without occupying an undue amount of space.

Having thus described my invention what I claim as new and desire to obtain by Letters Patent is:—

The combination of a peel plate having a bifurcated projection extending from one edge thereof forming a slot at the rear end of said plate, a bar extending transversely through the bifurcated ends of said projection and across the outer end of said slot, a pair of metallic plates secured to the peel plate and having their edges projecting across the inner end of the slot upon opposite sides of the plate, a handle, a metallic ferrule secured to said handle, one side thereof at its inner end being beveled and the opposite side having a transverse slot extended therethrough adapted to receive the rod extending across the slot and the beveled portion of the ferrule forming a nose adapted to engage the end of the peel plate and to fit between said metallic plates, for preventing the displacement thereof or wearing of the material constituting said plate.

Signed at New York, in the county of New York and State of New York, this 13th day of September, 1916.

STEFAN KREPS.

Copies of this patent may be obtained for five cents each, by addressing the "Commissioner of Patents, Washington, D. C."